United States Patent
Akamatsu et al.

(10) Patent No.: US 8,892,705 B2
(45) Date of Patent: Nov. 18, 2014

(54) INFORMATION PROCESSING SYSTEM, OPERATION MANAGEMENT METHOD FOR COMPUTER SYSTEMS, AND PROGRAM IN A DISTRIBUTED NETWORK ENVIRONMENT

(75) Inventors: Takeshi Akamatsu, Tokyo (JP); Takashi Terao, Kanagawa-ken (JP); Tsunefumi Watanabe, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1686 days.

(21) Appl. No.: 12/033,938

(22) Filed: Feb. 20, 2008

(65) Prior Publication Data

US 2008/0209005 A1    Aug. 28, 2008

(30) Foreign Application Priority Data

Feb. 23, 2007    (JP) .................................. 2007-44219

(51) Int. Cl.
| | |
|---|---|
| G06F 15/16 | (2006.01) |
| H04L 29/08 | (2006.01) |
| H04L 12/24 | (2006.01) |
| H04W 4/02 | (2009.01) |
| H04L 29/14 | (2006.01) |

(52) U.S. Cl.
CPC .............. *H04L 67/36* (2013.01); *H04L 41/044* (2013.01); *H04L 41/0856* (2013.01); *H04L 12/24* (2013.01); *H04L 41/00* (2013.01); *H04L 41/12* (2013.01); *H04W 4/02* (2013.01); *H04L 67/18* (2013.01); *H04L 69/40* (2013.01)
USPC .......................................... 709/223; 709/220

(58) Field of Classification Search
CPC ..... H04L 41/00; H04L 41/12; H04L 41/0856; H04L 41/044
USPC ........................................... 709/203.223–230
See application file for complete search history.

(56) References Cited

U.S. PATENT DOCUMENTS

| 7,472,179 | B2 | 12/2008 | Tarui et al. |
| 2005/0005190 | A1* | 1/2005 | Ofir et al. .......................... 714/4 |
| 2006/0277299 | A1* | 12/2006 | Baekelmans et al. ......... 709/224 |

FOREIGN PATENT DOCUMENTS

| JP | H09-027063 | 1/1997 |
| JP | 2000-013372 | 1/2000 |
| JP | 2005-151107 | 6/2005 |
| JP | 2005-292906 | 10/2005 |
| JP | 2006-079350 | 3/2006 |
| WO | WO2004010246 A2 | 1/2004 |
| WO | WO2004010292 A1 | 1/2004 |
| WO | WO2004010293 A1 | 1/2004 |
| WO | WO2004010298 A1 | 1/2004 |

* cited by examiner

*Primary Examiner* — David Lazaro
(74) *Attorney, Agent, or Firm* — Lee Law, PLLC; Christopher B. Lee (57) ABSTRACT

An operation management system capable of simultaneously detecting and managing, in a computer distributed processing environment, employs physical location information about locations where computers are located and logical location information of software programs running on the computers. Physical location information of a network connection device, such as a network switch, is described in a master data library or the like in advance, and is created as configuration items and discovered by a software dependency discovery unit. Configuration items stored in a configuration management database are associated with the configuration items for the physical location information. Preferably, the physical location information is configured as structured data. This makes it possible to establish hierarchical associations between configuration items for the physical location information.

20 Claims, 9 Drawing Sheets

INFORMATION PROCESSING SYSTEM, OPERATION MANAGEMENT METHOD FOR COMPUTER SYSTEMS, AND PROGRAM IN A DISTRIBUTED NETWORK ENVIRONMENT

FIELD OF THE INVENTION

The present invention relates to a method, information processing system, and program for operating and managing an entire system in a distributed network environment in which a plurality of computers are connected through a network.

BACKGROUND

With the spread of the Internet, web applications, and lower-cost and higher-performance computer hardware in recent years, more and more systems have been developed in a distributed network environment. That is, instead of centralizing all data and programs into a single, large, and expensive mainframe computer as was previously the case, many inexpensive computers are connected through a network to form a system. Although each of such inexpensive computers cannot compete with a mainframe computer in terms of throughput and reliability, it is possible to ensure data security by sharing the same data among a plurality of computers. This is because even if a failure occurs in one computer, the shared data can be provided by another computer. Moreover, by carrying out processing by a plurality of computers in a parallel and distributed manner, high throughput that is comparable to that of a large mainframe computer can be achieved by the entire distributed system.

However, in a distributed processing environment where processing is performed in parallel by a plurality of computers that are geographically and logically distributed, it is difficult to implement a system change associated with a system failure, extension, or the like. Since each of computers constituting the distributed processing environment is typically less reliable than a mainframe computer, it is more likely that any of the computers will fail at some point. As described above, a failure of one of the plurality of computers does not immediately affect the operation of the entire system. However, eventually the failed computer needs to be replaced or repaired as soon as possible.

However, in a distributed processing environment, due to its geographically and logically distributed features, it is not necessarily easy to locate the physical location of such a failed computer or determine how the failure of the computer affects logical dependencies between processes performed by software programs.

Besides failures, a change of system configuration also occurs frequently. For example, assume that a company has launched a website. The company has estimated a load on the website on the basis of the predicted volume of traffic and has built a web server with desired performance. However, it often happens that the server goes down, since the website gathers unexpected popularity and is accessed by far more visitors than expected. To cope with such a situation, the server may simply be replaced with one with greater capacity. Other possible solutions include use of failover clustering in which processing is passed to another server with an identical configuration upon failure of one server, and use of load distribution clustering in which a mechanism of a round robin or load balancer is used. However, in any case, geographical and logical relationships between components of the distributed processing environment may be greatly changed and thus, it may take considerable effort to reconfigure the existing system as an integrated system. Moreover, it is possible that the system resulting from the reconfiguration may not operate properly. In fact, some statistics show that 85 percent of system failures are caused by system changes.

Thus, operational costs in a distributed processing environment have been increasing. Since a distributed network system having a size exceeding a certain level is not manageable by human intervention alone, it is necessary to use an appropriate management system. This involves system management costs and operational costs (including personnel costs), which are said to be as much as 70 percent of the total IT costs.

Exemplary concepts of operation management tools for use for such purposes include a concept of a Configuration Management Database (CMDB) compiled by the Information Technology Infrastructure Library (ITIL) (British government's trademark). This is a system which collects information about logical dependencies or interactions between components of a distributed network, such as information about the configuration of each of computers connected to each other, information about applications running on the computers, configuration information about a network-attached storage (NAS) connected to the computers, and configuration information about a storage area network (SAN) directly connected to the network. The collected data may be passed to a graphical user interface (GUI) display tool, in which connections between a web server (e.g., Apache), an application server (e.g., WebSphere (IBM's trademark)), and a database system (e.g., DB2 (IBM's trademark)) are represented by blocks and links therebetween.

A product called Change and Configuration Management Database (CCMDB) provided by International Business Machines Corporation (IBM) implements the CMDB and is, at the same time, capable of managing configuration changes. The CCMDB uses a secure shell (SSH) to automatically and remotely execute a necessary command and collect data. These functions are described in PCT publications Nos. WO2004/010246, WO2004/010292, WO2004/010293, and WO2004/010298.

Japanese Unexamined Patent Application Publication No. 2000-13372 discloses a technique for managing facility information and location information of a device together, using a unique number of a network node as a key. With this technique, a physical connection configuration of network nodes to be managed is stored in a physical database, logical operation information resulting from monitoring of the network nodes is stored in a logical database, and current operation information and physical operation information retrieved from the physical and logical databases with respect to a specific network node are displayed on a display unit.

Japanese Unexamined Patent Application Publication No. 2005-292906 relates to a system for managing asset information and discloses a technique in which a physical identifier for identifying an asset and a logical identifier (e.g., Internet protocol (IP) address) corresponding to the physical identifier are stored, a physical identifier corresponding to an entered logical identifier is retrieved, and asset information corresponding to the retrieved physical identifier is output.

Japanese Unexamined Patent Application Publication No. 2006-79350 discloses a technique in which a media access control (MAC) address of a network card attached to a computer is associated with the computer's main body and stored in a database, and the location of the computer's main body is displayed on a layout screen such that the computer can be tracked even when it is moved.

With the conventional techniques described above, it is possible to provide information about dependencies between software programs running in a distributed processing environment. It is also possible to provide a method for managing, using unique physical information such as an MAC address, physical location information of a computer for running software programs.

With such a scheme of the conventional techniques described above, it is possible to detect dependencies between logical objects, such as software programs, to create link information, and possible to identify physical location information on the basis of a MAC address. However, with the scheme of the conventional techniques described above, it is not possible to properly associate a software program with hardware on which the software program is running. In fact, the CMDB framework is designed such that information about the physical location of hardware is abstracted as much as possible, and that the location of a computer and a software program running on the computer are rather not to be detected.

In practice, however, if an air conditioner in Room B on the first floor of Building A fails and the room temperature becomes too high for computers to operate, or if a power failure occurs in an area where computers are located, it is necessary to locate software programs running on such computers and thus affected by such a problem.

However, it is difficult for the conventional scheme to automatically detect software programs running on a computer in a particular area, since the physical location of hardware is abstracted. It may be possible to detect such software programs by obtaining, using a function of a network, a MAC address of a network card attached to a computer on which the software programs are running. In this case, it is necessary to manually refer to a hardware master data library using the obtained MAC address as a clue. This requires a visual check involving a heavy human workload.

SUMMARY

An object of the present invention is to advance the concepts of conventional configuration management systems and provide a configuration management system which makes it possible to associate logical relationships between a plurality of software programs running in a distributed network environment with physical location information of computer hardware on which the software programs are running.

The object described above, as well as other objects, may be achieved by designing a management system such that it is possible to use, for representing physical location information, components which are logically identical or similar to components that are data structures used for representing logical relationships between software programs. In a CMDB framework defined by ITIL, such components are referred to as configuration items (CIs). Therefore, the present invention may be regarded as a preferable and unobvious extension of an existing CMDB.

According to an embodiment of the present invention, a configuration management system first creates CIs for individual software programs running in a distributed network environment and associates the created CIs with each other on the basis of dependencies between the software programs. A known processing mechanism can be used for this processing. Then, the configuration management system of the embodiment obtains information about a network connection device, such as a network switch, router, or the like, to which computers are physically connected in the distributed network environment.

Upon obtaining the information about the network connection device, the configuration management system searches an address resolution protocol (ARP) table held by the network connection device, and makes an inquiry to a CMDB using an IP address and its corresponding MAC address listed in the ARP table. Thus, CIs stored in the CMDB can be associated with a computer connected to the network connection device.

A network connection device and its physical location are described in a master data library in advance. A master data library provides physical location information, such as building names, floor numbers, block numbers, room numbers, and the like. From the master data library, physical location information and each location information are stored as CIs in a CMDB in a physical location detection step described in detail below. Thus, for example, information, such as "one network switch is located in Room 401 on the fourth floor of Building A" and "another network switch is located in Room 102 on the first floor of Building B" is stored in the CMDB in a computer-searchable form.

CIs stored in the CMDB include a list of software programs running on each computer. Therefore, by associating CIs stored in the CMDB with a computer connected to a network connection device as described above, physical location information of the computer identified by the network connection device to which the computer is connected can be automatically associated with software programs running on the computer.

In a preferred embodiment of the present invention, CIs and relationships therebetween are composed of class instances in Java (Sun Microsystems Inc.'s trademark).

The present invention makes it possible to simultaneously and automatically detect physical location information and logical location information within the framework of a CMDB. Therefore, in the case of a system failure or system change, logical information about software programs can be identified together with physical location information of a computer on which the software programs are running. This reduces the amount of time required for an operator to analyze a network or system problem, and thus allows quick recovery from system failure.

Also, even when a problem arises, the operator can use both physical and logical location information to see the overall situation through an appropriate GUI. Therefore, it becomes less likely that the operator will overlook affected areas.

Additionally, the present invention makes it possible to identify a seemingly random failure together with its corresponding physical location. Therefore, it becomes easier to identify causes of and areas affected by a problem, such as a brownout in a particular section of a building, an abnormal temperature caused by an air-conditioning failure, interference in a wireless local area network (LAN), or the like.

As described above, in an advanced virtual machine environment, information as to which software program is running on a computer located in which physical location is abstracted. While convenient for the user, this has a drawback in that a person in charge of dealing with system failures or changes cannot easily detect the physical location of the computer. However, the present invention makes it possible for the person in charge to simultaneously and automatically detect physical and logical location information even in an environment where features of the virtual machine environment described above are still present. This improves the efficiency and expands the scope of application of system operation management.

It is difficult for conventional operation management systems to even track the physical location of a system, and therefore substantially impossible to detect the physical location of the system. However, a system and method of the present invention make it possible to automatically detect the physical location of a system. Therefore, it is also easy to examine the effects of changes in physical configuration.

BRIEF DESCRIPTION OF THE DRAWINGS

Embodiments of the present invention will now be described with reference to the drawings, wherein.

DETAILED DESCRIPTION

Figure 1:
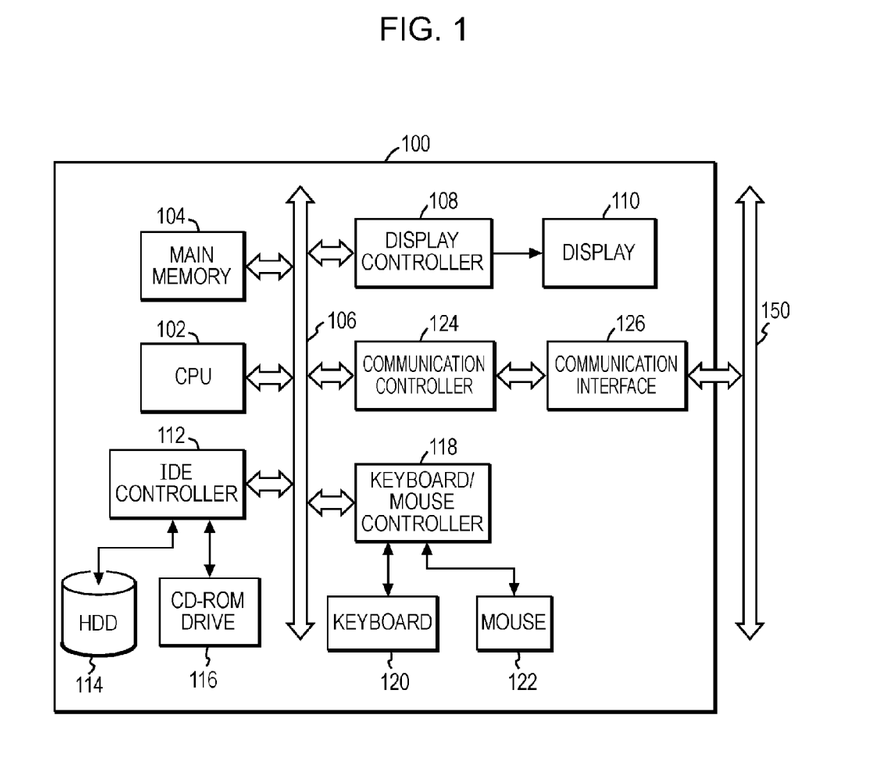
FIG. 1 is a block diagram of computer hardware for implementing the present invention.

FIG. 1 is a block diagram of computer hardware according to an embodiment of the present invention.

A computer (information processing system) 100 includes a central processing unit (CPU) 102 and a main memory 104, which are connected to a bus 106. The CPU 102 is preferably based on a 32-bit or 64-bit architecture and can use, for example, Pentium (R) 4 provided by Intel Corporation or Athlon (R) provided by Advanced Micro Devices, Inc. (AMD). A display 110, such as a liquid crystal display (LCD) monitor, is connected through a display controller 108 to the bus 106. For purposes of system operation and management, the display 110 is used to display, through an appropriate graphical interface, physical configuration information of computers connected through a communication line 150 to a network and logical configuration information of software programs running on the computers. A hard disk (HDD) 114 and a compact-disk read-only memory (CD-ROM) drive 116 are connected to the bus 106 through an integrated drive electronics (IDE) controller 112.

The hard disk 114 stores, in a form loadable into the main memory 104, a program for a physical location detection logic, a program for a physical location change detection logic, and a master data library which describes the physical location of a network switch (which are described in detail below) according to the present invention, as well as an operating system (OS), a program which provides a Java processing environment such as J2EE, an operation management program for a CMDB, and other programs and data. The operation management program preferably includes Tivoli (R) Application Dependency Discovery Manager (TADDM) provided by IBM. For details about the functions of TADDM, see http://www-306.ibm.com/software/tivoli/products/taddm/. The TADDM makes it possible to manage a plurality of server programs, database programs, application programs, and the like running on a plurality of computers in a distributed network by visualizing dependencies between them in a hierarchical manner.

The CD-ROM drive 116 is used to install an additional program on the hard disk 114 from a CD-ROM. A keyboard 120 and a mouse 122 are connected to the bus 106 through a keyboard/mouse controller 118. The keyboard 120 is used to enter data on a screen at an upper physical location according to a menu. The mouse 122 is used to click on a predetermined button to activate a physical location detection logic or the like.

A communication interface 126 follows an Ethernet protocol or the like and is connected through a communication controller 124 to the bus 106. The communication interface 126 serves to physically connect the computer 100 to the communication line 150, and provides a network interface layer to a TCP/IP communication protocol of a communication function of the OS for the computer 100. Although components illustrated in FIG. 1 are connected to each other by wired connection, they may be connected by wireless LAN connection based on a wireless LAN connection standard, such as IEEE802.11a/b/g.

Figure 2:
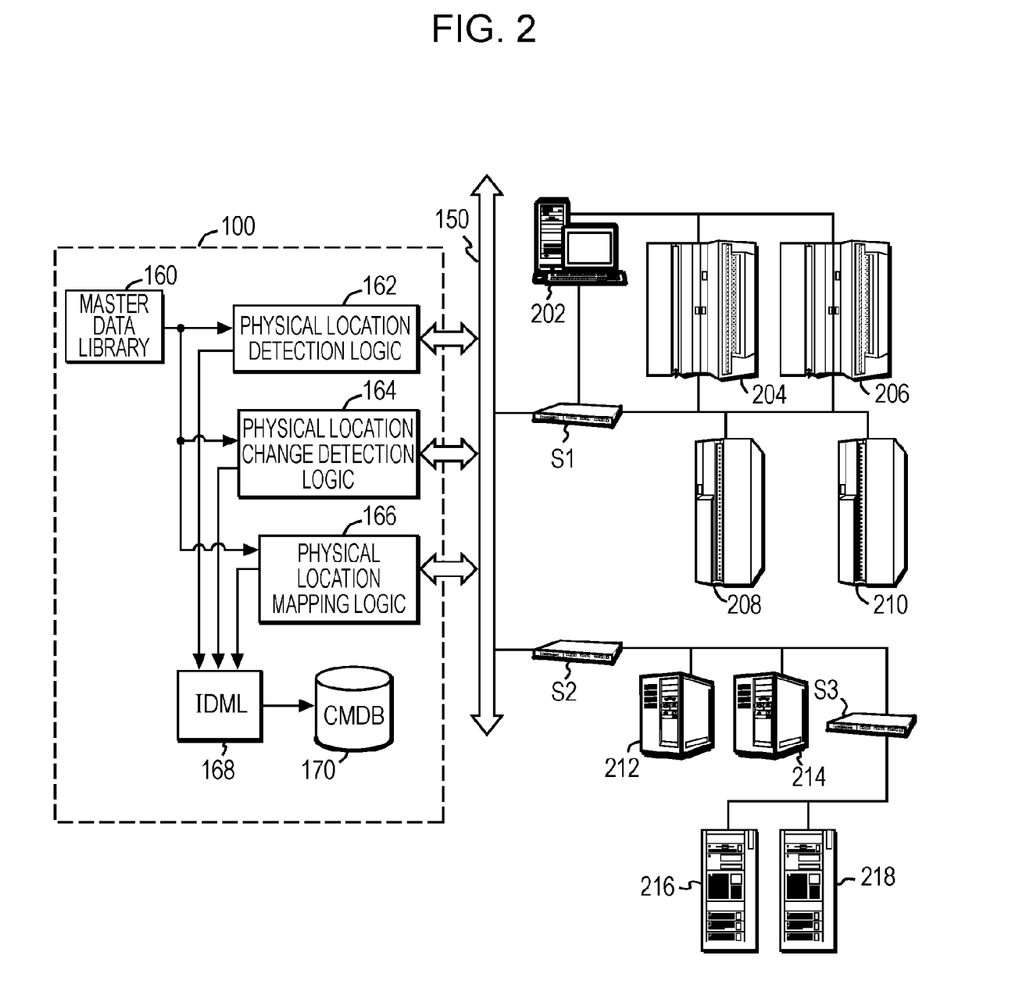
FIG. 2 is a block diagram illustrating a system for detecting physical location information of a computer network according to an embodiment of the present invention.

FIG. 2 illustrates a configuration in which a plurality of computers are connected through network switches to the communication line 150. Computers 204, 206, 208, and 210 are connected to a network switch S1, and computers 212 and 214 are connected to a network switch S2. Computers 216 and 218 are connected to a network switch S3, which is connected to the network switch S2.

In this embodiment, examples of network connection devices that can be used for connection to hardware devices (e.g., computers) include, but are not limited to, routers and hardware management consoles as well as the network switches described above. In other words, any network connection device can be used as long as it is capable of returning configuration information (e.g., IP addresses and MAC addresses) of computers connected to the network connection device, in response to a predetermined inquiry command from a computer on which network operation management programs are installed. A network switch and a router both have an ARP table containing a list of pairs of an IP address and its corresponding MAC address of computers connected to the network switch or router, and both are capable of returning the contents of the APR table in response to a predetermined inquiry command. A hardware management console is capable of returning computer configuration information which is more detailed than the APR table.

As illustrated in FIG. 2, a hardware management console 202 is connected to the computers 204 and 206. The hardware management console 202 is capable of dividing each of the computers 204 and 206 into a plurality of logical partitions using logical partitioning (LPAR or virtual LPAR). Then, the hardware management console 202 causes VMware to allow different OSes, such as Windows (R) and Linux (R), to run in the different logical partitions. By making an inquiry to the hardware management console 202 on a system basis, detailed information in the individual logical partitions of the computers 204 and 206 operated by LPAR.VMware can be obtained.

A master data library 160 in the left part of FIG. 2 describes, preferably in a hierarchical manner, the physical location of each network switch located within the network in which physical configuration information and logical configuration information are detected by the distributed processing system illustrated in FIG. 2. For example, the physical location of the network switch S1 is described using delimiters "," as "TokyoSales,BldgA,3F,ComputerRoom1". Initially, such a description is not automatically created by a computer, but has to be manually created after identifying the location of the network switch in the building. Instead of using ",", other delimiters such as "/", "(space)", or tab codes used by those skilled in the art may be used.

The master data library 160 thus created is stored in the hard disk 114 in a computer-searchable form, and may be manually updated in response to a physical change in network configuration, such as a move or addition of a network switch.

A physical location detection logic 162 is a program for initially and simultaneously detecting the physical configuration/location and logical configuration/location of a computer. The physical location detection logic 162 is preferably written in Java and is stored in the hard disk 114. For detection of configuration information, the physical location detection logic 162 is loaded into the main memory 104. This processing will be described in detail below with reference to a flowchart.

A physical location change detection logic 164 has a function similar to that of the physical location detection logic 162. However, the physical location change detection logic 164 is a program for detecting a change in physical configuration/location of the system after the physical configuration/location and the logical configuration/location are detected by the physical location detection logic 162, and issuing an alert if necessary. The physical location change detection logic 164 is also preferably written in Java and is stored in the hard disk 114. In response to a user operation of the keyboard 120 or mouse 122, or in response to a periodic call from a separate schedule routine, the physical location change detection logic 164 is loaded into the main memory 104 and executed. This processing will be described in detail below with reference to a flowchart.

Each network connection device (e.g., network switch, router, or hardware management console) used in the network is assigned a unique IP address when the network is built, and is, from then on, uniquely identified with the assigned IP address. Therefore, with such an IP address, the physical location detection logic 162 and the physical location change detection logic 164 can accurately identify a network connection device which they are accessing.

A physical location mapping logic 166 is a program for creating CIs for hierarchical physical configuration information on the basis of records in the master data library 160. The physical location mapping logic 166 is preferably written in Java and is stored in the hard disk 114. Then, the physical location mapping logic 166 is called by the physical location detection logic 162 and executed. This processing will be described in detail below with reference to a flowchart.

An Identity Markup Language (IDML) 168 is a kind of Extensible Markup Language (XML) and is a format used for loading CIs into a CMDB 170. IBM provides Data Link Application Programming Interface (DL API) for creating IDML files. The IDML 168 may preferably use the function of DL API. The IDML 168 will not be described in detail here, as it is not specifically related to the essence of the present invention. To put it briefly, IDML is a data format which allows a CMDB to maintain attributes of CIs and logical relationships between CIs.

Next, with reference to FIG. 3, the operation of the physical location detection logic 162 will be described. The physical location detection logic 162 is executed by an operator's operation of the keyboard 120 or mouse 122 (see FIG. 1) in the first stage when the system is built. In response to this operation, in step S302, the physical location detection logic 162 accesses the communication line 150 through the communication controller 124 and communication interface 126. Then, the physical location detection logic 162 searches for network switches, routers, and hardware management consoles on the communication line 150.

Figure 3:
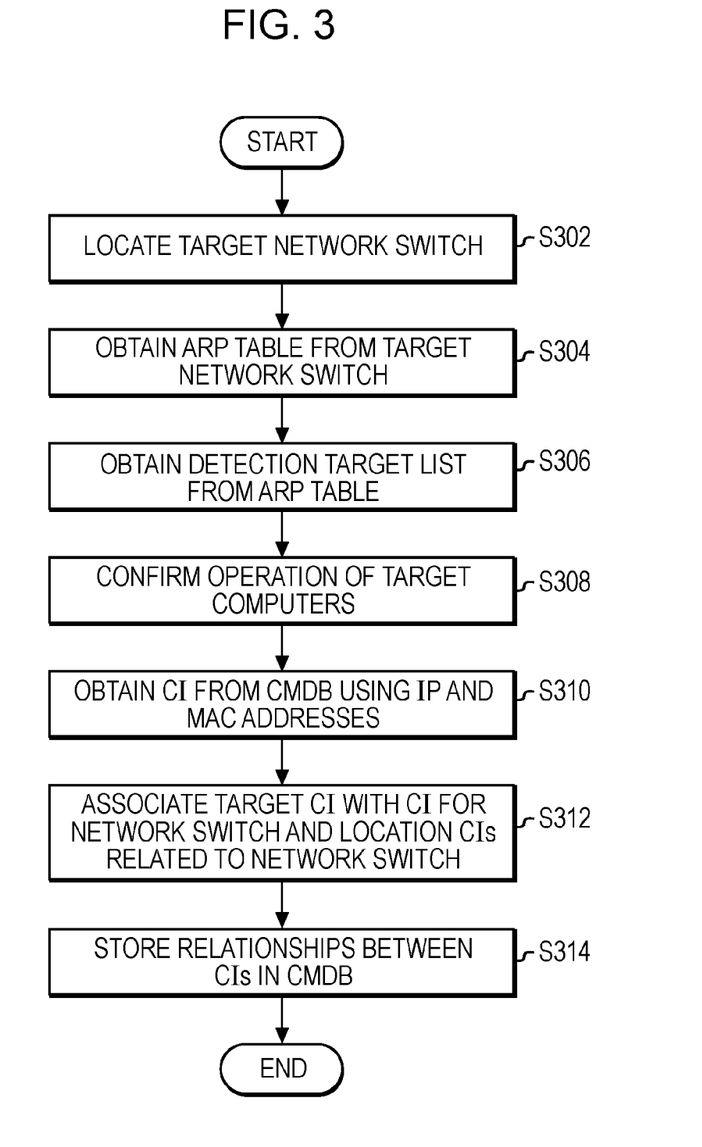
FIG. 3 is a flowchart showing processing of a physical location detection logic.

In step S302 of FIG. 3, the term "network switch" is used as a generic term for a network connection device capable of returning a value in an ARP table, and therefore may be replaced with "router". It is to be noted that a hardware management console for managing LPAR.VMware may also be regarded as a network connection device, as it is capable of returning configuration information similar to an ARP table.

When a network switch is found, the IP address of the network switch is used to search the CMDB 170 for a CI for the network switch. If the CI is not found, a new CI is created. Then, physical configuration information of the network switch is retrieved from the master data library 160 and set in the CI.

Next, in step S304, an ARP table in the network switch is obtained. In step S306, pairs of IP and MAC addresses listed in the ARP table are examined. Table 1 shows an example of the ARP table entry. It is to be understood that this table is presented for illustrative purposes and thus, the IP and MAC addresses listed therein are not equivalent to actual IP and MAC addresses.

TABLE 1

| IP ADDRESS | MAC ADDRESS |
| --- | --- |
| 10.190.5.141 | 00-1e-53-7e-ff-cd |
| 12.118.4.62 | 00-2c-46-ee-cd-ef |
| 11.101.13.46 | 00-33-2f-c1-4d-ae |

In step S308, the physical location detection logic 162 performs processing like "ping" processing using a series of IP addresses obtained in step S306 to confirm the operation of target computers. Only a computer whose operating condition is confirmed here is processed in the next step S310.

In step S310, the physical location detection logic 162 refers to the CMDB 170 using the IP address of a computer whose operating condition has been confirmed and the MAC address corresponding to the IP address. If processing of the function of TADDM is completed in advance, a CI for the corresponding computer should be already stored in the CMDB 170 and as a result, the corresponding CI is returned. If for any reason such a CI cannot be found in the CMDB 170, a CI may be associated with the computer in the next periodic execution of the physical location change detection logic 164, or the function of TADDM may be immediately called to create a CI, which is then associated with the computer.

In step S312, the CI for the identified target computer is associated with the CI for the network switch and, if any, with other CIs associated with the network switch.

The relationships between the CI for the network switch and other CIs associated with the network switch are temporarily saved in the hard disk 114 in an IDML format and stored, through the IDML 168, in the CMDB 170 in step S314.

As illustrated in FIG. 2, the network switch S3 can be connected to the network switch S2 as an additional switch. In this case, since an ARP table in the network switch S2 shows which network switch is the additional switch, the steps of FIG. 3 may be recursively applied.

In this embodiment of the present invention, CIs and the relationships therebetween are all implemented as Java class instances. This implementation will be described with reference to FIG. 7. A subset composed of the network switch S2 and the computers 212 and 214 connected thereto will be discussed for illustrative purposes. In step S302 of FIG. 3, upon locating the network switch S2, the physical location detection logic 162 uses the IP address of the network switch S2 to retrieve a CI corresponding to the network switch S2 from the CMDB 170. Physical location information, such as a building section number "SE04", previously retrieved from the master data library 160 is set in the CI. This information is loaded through the IDML 168 into the CMDB 170 and implemented as a Java class instance. The Java class instance implemented as described above is stored in the CMDB 170, for example, by a mechanism called Java Data Objects (JDO) for making Java class instances persistent and storing them in a hard disk. Therefore, even if the computer 100 for operation management is temporarily turned off, the created Java class instance is not lost. When the computer 100 is turned on next time, the Java class instance is read from the hard disk 114, expanded in the main memory 104, and becomes a Java class instance that can be changed or deleted by a Java program. Therefore, the following description will be made on the understanding that a CI is created as a Java class instance in the CMDB 170.

Figure 7:
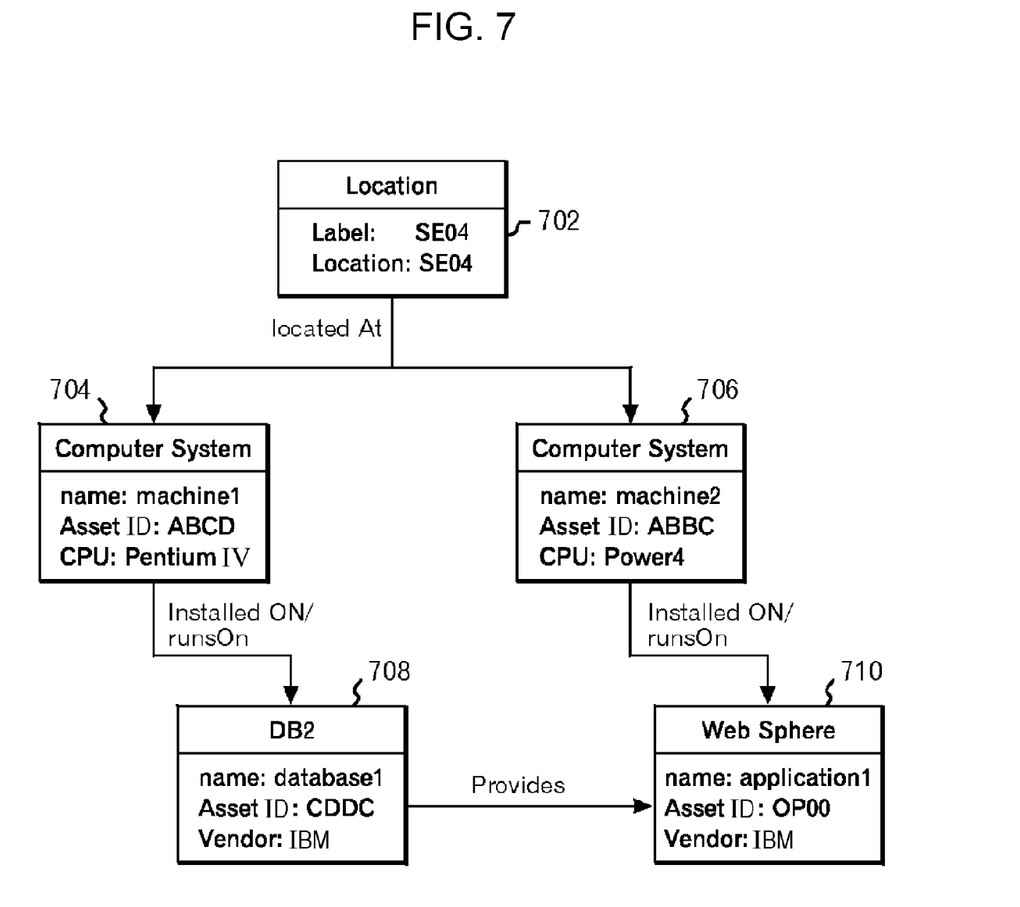
FIG. 7 illustrates CIs for physical and logical location information, and Java class instances for associating the CIs with each other.

The CI for the network switch S2 is represented as an instance (CI) 702 of a Java class "Location". The class also contains other information, such as an internal parameter representing physical location information, the IP address (not shown) of the network switch S2, and the like.

By searching the ARP table in the network switch S2 in step S306 of FIG. 3, CIs 704 and 706 for the computers 212 and 214 (see FIG. 2), respectively, are found in the CMDB 170. Thus, as illustrated in FIG. 7, the CI 702 can be associated with the CIs 704 and 706. In this embodiment, these CIs are associated with each other by instances of a Java class "LocatedAt".

In a simple form, this Java class is represented by code description as follows and provides methods for getting or setting values of "SourceID" and "DestinationID" of CIs.

```
class LocatedAt       {
    String SourceID;
    String DestinationID;
    String GetSource( ) {
        return SourceID;
    }
    String GetDestination( ) {
        return DestinationID;
    }
    void SetSource( String ASourceID ) {
        SourceID = ASourceID;
    }
    void SetDestination( String ADestinationID ) {
        DestinationID = ADestinationID;
    }
}
```

That is, an instance called "LocatedAt" for associating the CI 702 with the CI 704 and an instance called "LocatedAt" for associating the CI 702 with the CI 706 are created.

At the same time, the CI 702 and the CI 706 are implemented as instances of a Java class called "ComputerSystem". As shown in FIG. 7, the Java class called "ComputerSystem" contains parameters representing attributes of a computer, such as "name", "AssetID", and "CPU". While not shown, this class further contains parameters, such as an IP address, a MAC address, and the like.

Additionally, software programs installed and running on the computers 208 and 210 are detected by the function of the TADDM and stored as CIs 708 and 710 in the CMDB 170. As shown in FIG. 7, the CIs 708 and 710 each are implemented as an instance of a Java class which represents a software program and contains parameters representing attributes of the software program, such as "name", "AssetID", and "Vendor".

The relationship between a CI representing a computer and a CI for a software program installed on the computer is implemented as an instance of a Java class called "InstalledOn". Likewise, the relationship between a CI representing a computer and a CI for a software program running on the computer is implemented as an instance of a Java class called "RunsOn". Although not described in detailed here, the Java classes "InstalledOn" and "RunsOn" also provides methods for getting or setting values of "SourceID" and "DestinationID", similar to the case of "LocatedAt".

Figure 4:
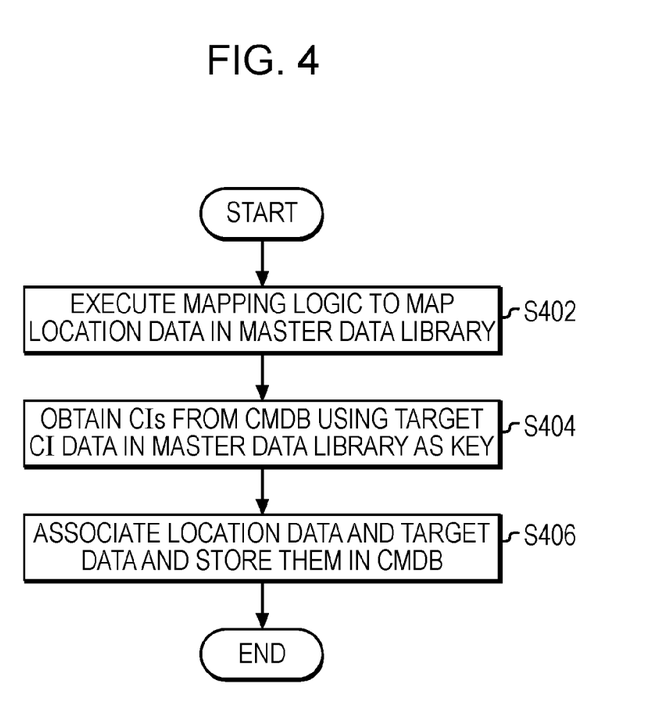
FIG. 4 is a flowchart showing processing of the physical location detection logic and in particular, processing of data in a master data library.

Now with reference to FIG. 4, another function of the physical location detection logic 162 will be described. Basically, the function of the physical location detection logic 162 shown in FIG. 3 is automatically activated and operated by the operation management system. On the other hand, the function shown in FIG. 4 is activated by the operator when necessary. In step S402 of FIG. 4, the physical location mapping logic 166 is executed on the basis of data in the master data library 160. The physical location mapping logic 166 will now be described in detail with reference to FIG. 5.

For the purpose of clarification, specific data in the master data library 160 will be discussed. As shown in Table 2 below, the master data library 160 shows physical location information for each item, such as a network connection device (e.g., a network switch, router, or hardware management console (HMC)), to which a group of hardware devices are connected. Although not shown for convenience of illustration, the master data library 160 in practice may further contain other information, such as the IP address of each network connection device.

TABLE 2

| Item | Physical Location Information |
|---|---|
| Switch S1 | BldgA, 2F, R21 |
| Switch S2 | BldgB, 4F, R41 |
| Switch S3 | BldgB, 4F, R41, C1 |
| HMC1 | BldgA, 2F, R22 |
| ... | ... |
| ... | ... |
| ... | ... |
| Switch Sn | BldgC4FR5101 |

Figure 5:
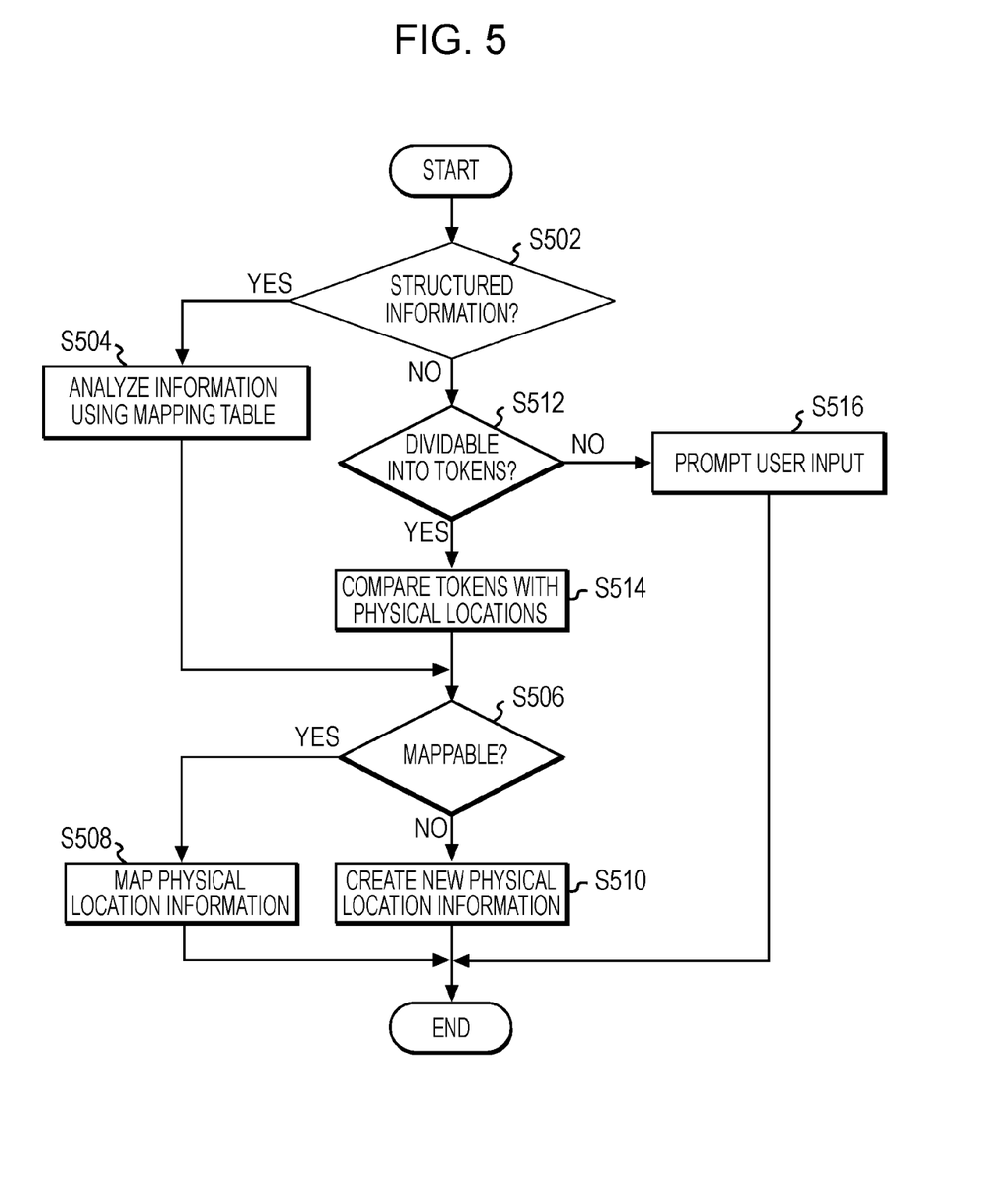
FIG. 5 is a flowchart showing processing of a physical location mapping logic.

In step S502 of FIG. 5, it is determined whether physical location information is structured information. Here, structured information means, for example, location information that is hierarchically structured, such as "building,floor, room", by inserting appropriate delimiters, such as ";", "/", or spaces.

If it is determined in step S502 that the physical location information is structured information delimited by appropriate delimiters, an analysis is performed using a mapping table. The term "analysis" means to process physical location information as a hierarchical structure. For example, in the case of physical location information "BldgA,2F,R21" for Switch S1 in Table 2 above, "BldgA" in the first layer, "2F" in the second layer, and "R21" in the third layer are identified by the analysis as items to be mapped.

It is to be understood that, as in the case of Java class instances of FIG. 7, CIs for hierarchical physical location information are preferably created in an IDML format, stored in the CMDB 170, and implemented as Java class instances.

Again, a Java class "LocatedAt" is used to indicate that a CI for certain physical location information is located at a CI for physical location information in an upper layer. In other words, when viewed from the operation management system, buildings and rooms, network connection devices, computers, virtual processing environments implemented on the computers, Web servers running on the computers, application servers, software programs such as database programs are stored in the CMDB 170 and treated as logically equivalent items, in terms of being CIs. This can significantly increase the availability and flexibility of the operation management system, as will be understood by those skilled in the art.

A physical location CI may be created in any unit depending on the domain of the distributed system to be operated and managed, and may be created in a unit larger than a building. Examples of such a physical location CI include an office CI, a city CI, a prefecture CI, and a state CI.

Next, in step S506, it is determined whether the items identified as described above are mappable or, in other words, already created as CIs in the CMDB 170. If they are mappable, a CI in the bottom layer, that is, physical location information "R1" is mapped.

Figure 8:
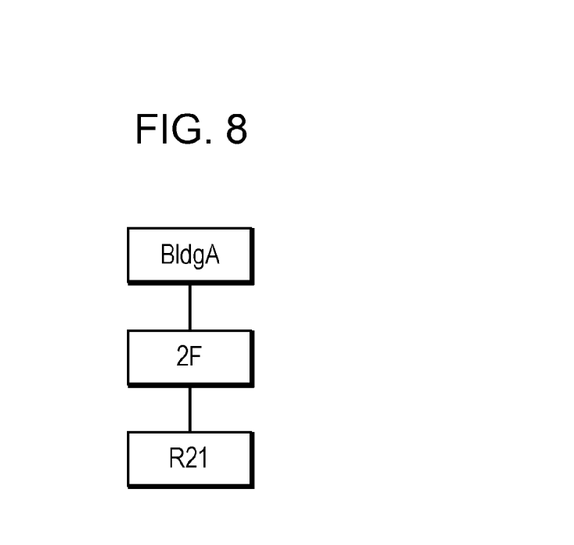
FIG. 8 illustrates CIs for physical location information based on the master data library.

On the other hand, if it is determined in step S506 that the items identified as described above are not mappable, CIs for physical locations as illustrated in FIG. 8 are newly created in step S510 and stored in the CMDB 170.

If it is determined in step S502 that the physical location information is not structured information, it is further determined in step S512 whether the physical location information can be divided into tokens. An example of such unstructured information is "BldgC4FR5101" for Switch Sn shown in Table 2 above. However, if there is a rule stating that a floor number is expressed as "number+F" and a room number starts with the letter "R", "BldgC4FR5101" can be divided into tokens "BldgC", "4F", and "R5101". Thus, in step S514, the resulting tokens are replaced with their corresponding physical locations as much as possible and then, the processing proceeds to the determination in step S506. Alternatively, unstructured physical location information may be divided into tokens by comparing it with existing physical location information that is structured. For example, if there is physical location information, such as "BldgC,5F,R5111", portions of unstructured physical location information that match portions of this existing physical location information may be extracted and the remaining portions may be treated as independent tokens.

If it is determined in step S512 that the physical location information cannot be divided into tokens even if an existing rule is applied, the user is prompted in step S516 to enter physical location information in a structural manner by separating each element of the physical location information with a predetermined letter. The structured physical location information thus entered is preferably reflected in the master data library 160 and used in the next physical mapping.

Figure 9:
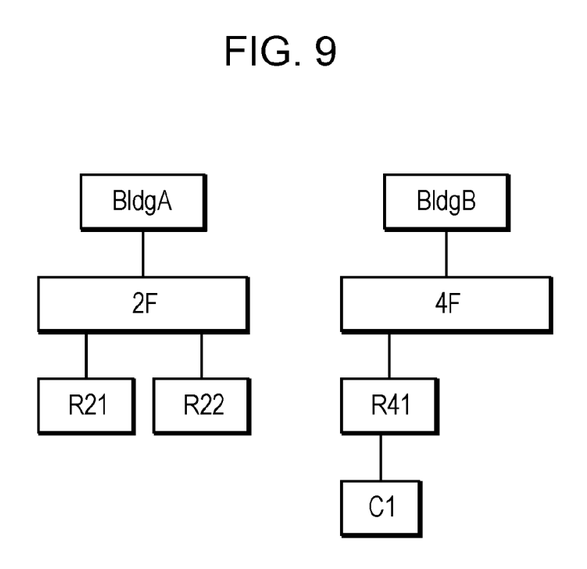
FIG. 9 illustrates CIs for physical location information based on the master data library.

Referring back to FIG. 4, in step S402, hierarchical physical location information such as that illustrated in FIG. 9 is obtained by calling the physical location mapping logic 166 on the basis of physical data in the master data library 160.

Then, in step S404, target CI data in the master data library 160 is used as a key to obtain its related CIs from the CMDB 170 and associate them with each other. For example, according to the master data library 160 (see Table 2), Switch S1 is associated with the physical location "R21" of FIG. 9. As illustrated in FIG. 2, since the computers 208 and 210 are associated with Switch S1, CIs for the computers (hardware devices) 208 and 210 and CIs for software programs installed and running on the computers 208 and 210 are further associated, as logical configuration information, with a CI for "R21".

Figure 10:
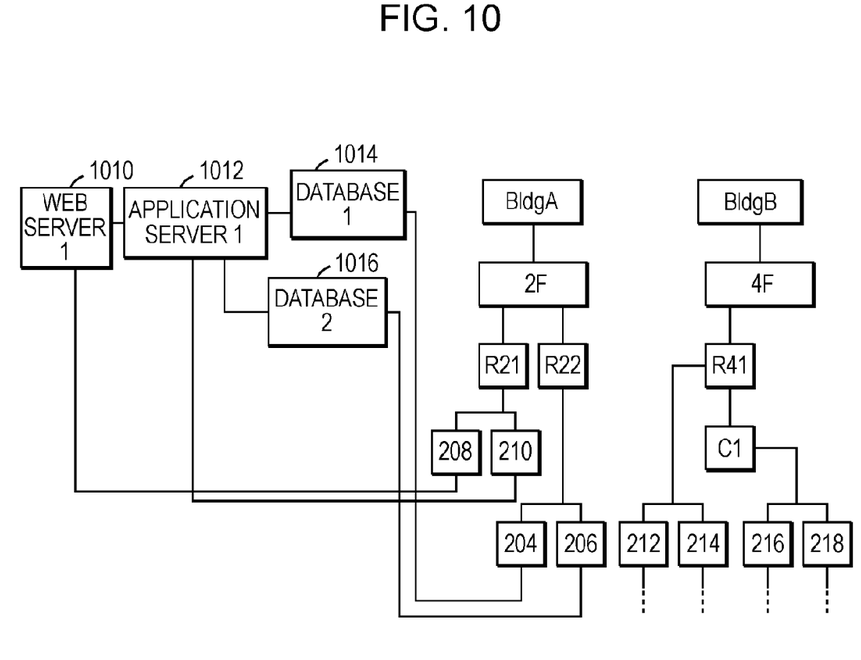
FIG. 10 illustrates physical and logical location information CIs associated with each other.

Thus, as illustrated in FIG. 10, dependencies between CIs for buildings and rooms BldgA, 2F, R21, R22, BldgB, 4F, R41, and C1; CIs for the computers (hardware devices) 204, 206, 208, 210, 212, 214, 216, and 218; and CIs for application programs 1010, 1012, 1014, and 1016 running on the computers 208, 210, and so on are established in the CMDB 170 and can be displayed on the display 110 by an appropriate GUI display module.

Next, with reference to FIG. 6, processing of the physical location change detection logic 164 will be described. The physical location change detection logic 164 is substantially the same as the physical location detection logic 162 in terms of basic function. The physical location change detection logic 164 is activated according to periodic scheduling or in response to a user operation. It is to be noted here that when there is a change in physical location, the corresponding CI can be created by the physical location detection logic 162 alone, without help of the physical location change detection logic 164. Therefore, a more important function of the physical location change detection logic 164 it to detect a change in physical location and alert the operator of the operation management system to the change.

Figure 6:
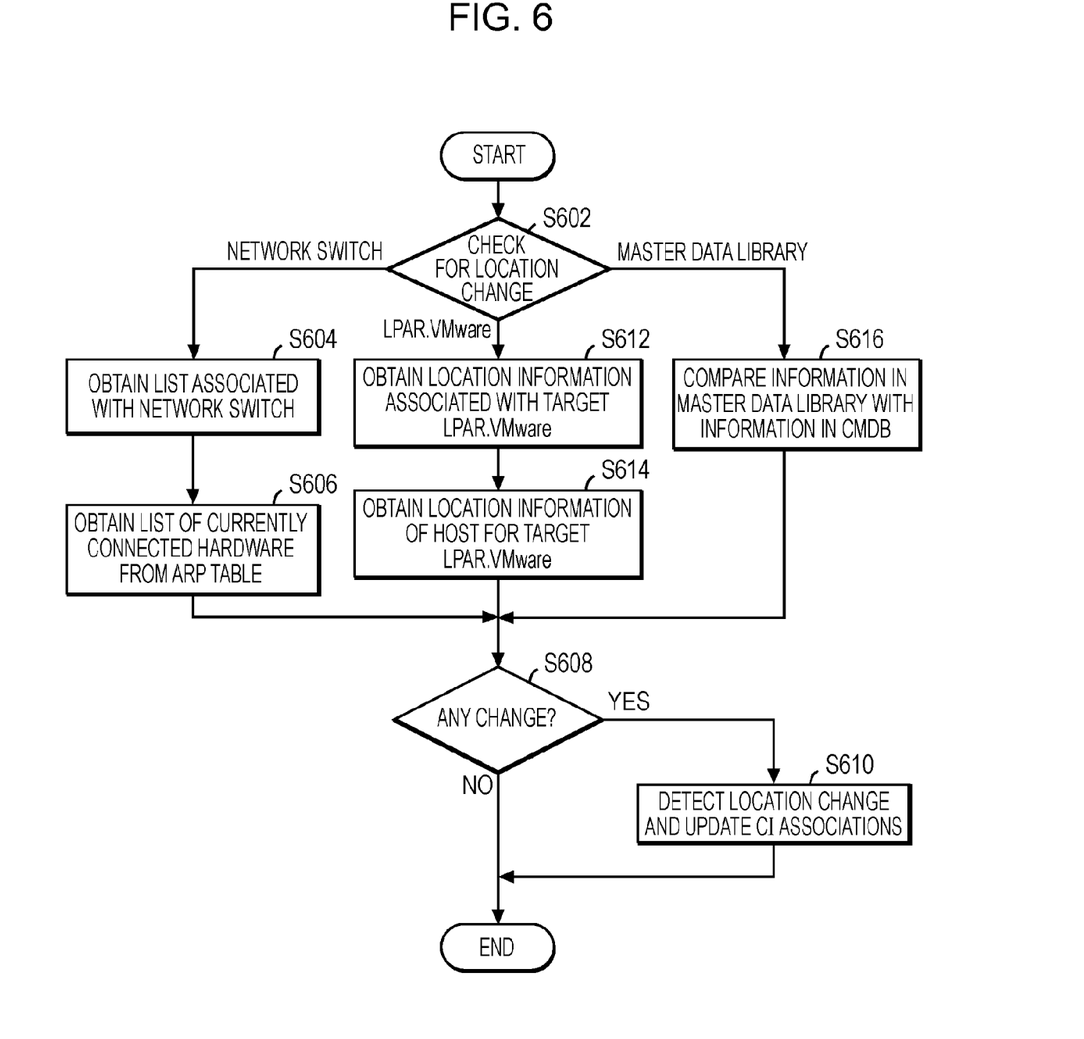
FIG. 6 is a flowchart showing processing of a physical location change detection logic.

Although step S602 of FIG. 6 is illustrated as being a determination step, it may be understood as being a step of sequentially checking a network switch, LPAR.VMware, and master data library for any location changes. The term "network switch" shown to the left of step S602 is used as a generic term for a network connection device capable of returning a value in an ARP table, and therefore may be replaced with "router".

In step S604, for a location change of a network switch, a list associated with the network switch is obtained. In step S606, a list of hardware devices currently connected to the network switch is obtained from an ARP table in the network switch. Then, CIs related to the network switch are retrieved from the CMDB 170 and compared with the information obtained from the ARP table. If there is a mismatch, the operator is alerted in step S608 that there is a change. In step S610, the function of TADDM is called to create CIs again and associate them with each other.

Similarly, in the case of LPAR.VMware, location information associated with LPAR.VMware is obtained by a hardware management console in step S612. On the basis of the obtained location information, location information of a host of target LPAR.VMware is obtained in step S614 and compared with its related CIs stored in the CMDB 170. If there is a mismatch, the operator is alerted in step S608 that there is a change. In step S610, the function of TADDM is called to create CIs again and associate them with each other.

In the case of the master data library 160, for example, if a new building name, room name, or the like is added to the master data library 160, a comparison performed in step S616 indicates that the corresponding CI does not exist in the CMDB 170. Or if the physical location of a network switch is changed and the change is reflected in the master data library 160, the location indicated by a CI corresponding to the network switch does not match the description of the corresponding physical location in the master data library 160. Or if a network switch and a computer set connected thereto are removed from a room, an entry corresponding to their CIs is not found in the master data library 160. In such cases, the operator is alerted in step S608 that there is a change. In step S610, for example, the routine shown in FIG. 4 is activated.

Then, CIs for new location information are associated with CIs for their corresponding hardware devices.

Referring back to FIG. 10, when CIs for physical configuration information, CIs for logical configuration information, and their relationships are created and stored in the CMDB 170, this stored information can be graphically displayed on the display 110 by a typical GUI. Moreover, by using dependencies between CIs, it will be possible for those skilled in the art to display, in a larger view in a new window, a room CI, CIs for computers, and CIs for software programs running on the computers associated with a specific displayed CI when it is clicked on.

In the embodiments described above, a CI for a room and a CI for a network connection device located in the room are treated as being equivalent. Therefore, although the CI for the room is displayed, the CI for the network connection device is not displayed. This is based on the idea that it is not necessary to treat a network connection device as an independent device, as it is merely a relaying device. However, if a plurality of network connection devices are placed in one room or if a network connection device has a special intelligent function, a CI for such a network connection device may be displayed separately from CIs for the physical location information, such as a building, room, and the like.

Although the present invention has been described with reference to some embodiments, these embodiments are presented for illustrative purposes only. It will be understood that those skilled in the art can make various modifications without departing from the technical scope of the present invention. For example, instead of a CMDB and CIs stored therein, a database and components of other types may be used. Besides a Java environment, any computer development environment (e.g., C++ or C# environment) where an API with a network management function can be called can be used.

What is claimed is:

1. An information processing system for managing, in a distributed processing system in which a plurality of computers are connected through a network connection device, configuration information of the distributed processing system, the information processing system comprising:
    storage means for computer-readably storing physical location information of the network connection device;
    obtaining means for obtaining information about network addresses of the plurality of computers connected to the network connection device;
    obtaining means for obtaining information about software programs running on the plurality of computers connected to the network connection device; and
    recording means for recording the physical location information of the network connection device such that the physical location information is associated with the information about the network addresses of the plurality of computers and with the information about the software programs running on the plurality of computers.

2. The information processing system according to claim 1, wherein the network connection device is a network switch or a router, and the information about the network addresses of the plurality of computers is detected using information in an address resolution protocol table held by the network connection device.

3. The information processing system according to claim 1, wherein when the plurality of computers connected to the network connection device are configured as a virtual system, configuration information of the virtual system is detected using information provided by a hardware management console.

4. The information processing system according to claim 1, wherein the recording means is a configuration management database, and the physical location of the network connection device, information about the network addresses of the plurality of computers, and information about the software programs running on the plurality of computers are created as configuration items and stored in the configuration management database along with information about dependencies between the configuration items.

5. The information processing system according to claim 4, wherein the physical location of the network connection device is associated with physical locations hierarchically structured, and configuration items which represent information about the network addresses of the plurality of computers connected to the network connection device and information about the software programs running on the computers have a hierarchical data structure.

6. The information processing system according to claim 4, wherein relationships between a configuration item representing the physical location of the network connection device and configuration items representing the information about the network addresses of the plurality of computers and about the software programs running on the plurality of computers are implemented as class instances.

7. An operation management method for computer systems and for managing, in a distributed processing system in which a plurality of computers are connected through a network connection device, configuration information of the distributed processing system, the method comprising the steps of:
    identifying physical location information of the network connection device;
    obtaining information about network addresses of the plurality of computers connected to the network connection device;
    obtaining information about software programs running on the plurality of computers connected to the network connection device; and
    recording, in recording means, the physical location information of the network connection device such that the physical location information is associated with the information about the network addresses of the plurality of computers and with the information about the software programs running on the plurality of computers.

8. The method according to claim 7, wherein the physical location information of the network connection device is identified by referring to a list of physical locations recorded for each network connection device in advance in a configuration management database.

9. The method according to claim 8, wherein the network connection device is a network switch or a router, and the information about the network addresses of the plurality of computers is detected using information in an address resolution protocol table held by the network connection device.

10. The method according to claim 8, wherein when the plurality of computers connected to the network connection device are configured as a virtual system, configuration information of the virtual system is detected using information provided by a hardware management console.

11. The method according to claim 10, wherein the recording means is a configuration management database, and the physical location of the network connection device, information about the network addresses of the plurality of computers, and information about the software programs running on the plurality of computers are created as configuration items and stored in the configuration management database along with information about dependencies between the configuration items.

12. The method according to claim 11, wherein the physical location of the network connection device is associated with physical locations hierarchically structured, and configuration items which represent information about the network addresses of the plurality of computers connected to the network connection device and information about the software programs running on the computers have a hierarchical data structure.

13. The method according to claim 12, wherein relationships between a configuration item representing the physical location of the network connection device and configuration items representing the information about the network addresses of the plurality of computers and about the software programs running on the plurality of computers are implemented as class instances.

14. A computer program product comprising a computer readable computer storage memory having encoded thereon a program of instructions for managing, in a distributed processing system in which a plurality of computers are connected through a network connection device, configuration information of the distributed processing system, the program of instructions causing a computer to execute the steps of:
 identifying physical location information of the network connection device;
 obtaining information about network addresses of the plurality of computers connected to the network connection device;
 obtaining information about software programs running on the plurality of computers connected to the network connection device; and
 recording, in recording means, the physical location information of the network connection device such that the physical location information is associated with the information about the network addresses of the plurality of computers and with the information about the software programs running on the plurality of computers.

15. The program product according to claim 14, wherein the physical location information of the network connection device is identified by referring to a list of physical locations recorded for each network connection device in advance in a configuration management database.

16. The program product according to claim 14, wherein the network connection device is a network switch or a router, and the information about the network addresses of the plurality of computers is detected using information in an address resolution protocol table held by the network connection device.

17. The program product according to claim 16, wherein when the plurality of computers connected to the network connection device are configured as a virtual system, configuration information of the virtual system is detected using information provided by a hardware management console.

18. The program product according to claim 17, wherein the recording means is a configuration management database, and the physical location of the network connection device, information about the network addresses of the plurality of computers, and information about the software programs running on the plurality of computers are created as configuration items and stored in the configuration management database along with information about dependencies between the configuration items.

19. The program product according to claim 18, wherein the physical location of the network connection device is associated with physical locations hierarchically structured, and configuration items which represent information about the network addresses of the plurality of computers connected to the network connection device and information about the software programs running on the computers have a hierarchical data structure.

20. The program product according to claim 19, wherein relationships between a configuration item representing the physical location of the network connection device and configuration items representing the information about the network addresses of the plurality of computers and about the software programs running on the plurality of computers are implemented as class instances.

* * * * *